(12) United States Patent
Nagatomo et al.

(10) Patent No.: US 12,083,960 B2
(45) Date of Patent: Sep. 10, 2024

(54) VEHICLE DOOR MIRROR

(71) Applicant: KABUSHIKI KAISHA HONDA LOCK, Miyazaki (JP)

(72) Inventors: Masaki Nagatomo, Miyazaki (JP); Yasuyuki Etou, Miyazaki (JP)

(73) Assignee: Minebea AccessSolutions Inc., Miyazaki (JP)

( * ) Notice: Subject to any disclaimer, the term of this patent is extended or adjusted under 35 U.S.C. 154(b) by 434 days.

(21) Appl. No.: 17/605,755

(22) PCT Filed: Jun. 2, 2020

(86) PCT No.: PCT/JP2020/021720
§ 371 (c)(1),
(2) Date: Oct. 22, 2021

(87) PCT Pub. No.: WO2020/246453
PCT Pub. Date: Dec. 10, 2020

(65) Prior Publication Data
US 2022/0250545 A1      Aug. 11, 2022

(30) Foreign Application Priority Data

Jun. 5, 2019    (JP) .................................. 2019-105095

(51) Int. Cl.
B60R 1/06         (2006.01)
(52) U.S. Cl.
CPC ...................................... B60R 1/06 (2013.01)
(58) Field of Classification Search
CPC ........................................................ B60R 1/06

(Continued)

(56) References Cited

U.S. PATENT DOCUMENTS 5,245,480 A * 9/1993 Polzer ...................... B60R 1/06
359/872
8,568,006 B2 * 10/2013 Asai ...................... B60R 1/1207
362/523

(Continued)

FOREIGN PATENT DOCUMENTS

JP        2009-248693 A      10/2009
JP        2014-104831 A       6/2014

(Continued)

*Primary Examiner* — Ricky D Shafer
(74) *Attorney, Agent, or Firm* — Carrier, Shende & Associates P.C.; Joseph P. Carrier; Jeffrey T. Gedeon (57) ABSTRACT

A vehicle door mirror includes a mirror housing formed from a housing main body having a mirror housing recess part having a mirror housed therein, and a plurality of cover members that cover the housing main body from a side opposite to an open direction of the mirror housing recess part, the cover members which are engaged with each other, being engaged with the housing main body, wherein a first restricting projection part projectingly provided on one cover member is formed shorter than a second restricting projection part projectingly provided on the other cover member and abutting against the housing main body, and is disposed so as to overlap the second restricting projection part in an up-and-down direction, and the second restricting projection part has formed thereon an abutment face, an extremity portion of the first restricting projection part being in the proximity of or abutting against the abutment face.

1 Claim, 8 Drawing Sheets

(58) Field of Classification Search
USPC .......................................................... 359/841
See application file for complete search history.

(56) References Cited

U.S. PATENT DOCUMENTS

| | | | | |
|---|---|---|---|---|
| 8,858,002 | B2* | 10/2014 | Suzuki | B60R 1/072 |
| | | | | 359/872 |
| 11,472,341 | B2* | 10/2022 | Yamashita | B60R 1/074 |
| 11,691,569 | B2* | 7/2023 | Kenmochi | B60R 1/06 |
| | | | | 362/494 |
| 2008/0316627 | A1* | 12/2008 | Shinohara | B60R 1/06 |
| | | | | 359/871 |
| 2010/0296189 | A1* | 11/2010 | Lettis | B60R 1/06 |
| | | | | 359/876 |
| 2015/0116165 | A1* | 4/2015 | Hiraoka | H01Q 1/3266 |
| | | | | 359/871 |
| 2017/0349101 | A1 | 12/2017 | Eto | |
| 2019/0039520 | A1* | 2/2019 | Sawada | B60R 1/06 |
| 2019/0077317 | A1* | 3/2019 | Muto | B60R 1/072 |
| 2019/0359136 | A1* | 11/2019 | Eto | B60R 1/072 |
| 2020/0148117 | A1* | 5/2020 | Fujisaki | B60R 1/072 |

FOREIGN PATENT DOCUMENTS

| | | | |
|---|---|---|---|
| JP | 2016-117371 | A | 6/2016 |
| JP | 2017-213983 | A | 12/2017 |

* cited by examiner

VEHICLE DOOR MIRROR

TECHNICAL FIELD

The present invention relates to a vehicle door mirror that includes a mirror housing that is formed from a housing main body having a mirror housing recess part having a mirror housed therein, and a plurality of cover members that cover the housing main body from a side opposite to an open direction of the mirror housing recess part, the cover members, which are engaged with each other, being engaged with the housing main body.

BACKGROUND ART

A vehicle door mirror in which a lower cover and an upper cover that are elastically engaged with each other are elastically engaged with a housing main body is known from Patent Document 1. In this vehicle door mirror, although an arrangement that prevents an elastically engaged state of the lower cover and the upper cover from being released by an external force or vibration is disclosed, an arrangement that prevents elastic engagement, with the housing main body, of the lower cover and the upper cover in a mutually elastically engaged state from being released by the application of an external force is not disclosed. On the other hand, a vehicle door mirror in which a mirror housing is formed from a housing main body and one cover member that is engaged with the housing main body is disclosed in Patent Document 2, and in this arrangement in order to prevent the engagement of the cover member with the housing main body from being released by an external force, a projection piece projectingly provided on the cover member is made to engage with and abut against the housing main body, thus preventing the cover member from being flexed even with the application of an external force and thereby preventing the cover member from being detached from the housing main body, and it is thought that the application of such a technique can prevent a plurality of cover members from being detached from a housing main body.

PRIOR ART DOCUMENTS

Patent Documents

Patent Document 1: Japanese Patent Application Laid-open No. 2016-117371
Patent Document 2: Japanese Patent Application Laid-open No. 2009-248693

DISCLOSURE OF INVENTION

Problems to be Solved by the Invention

However, if the technique disclosed in Patent Document 2 above is simply applied to a vehicle door mirror in which a plurality of cover members are engaged with a housing main body, a restricting projection part projectingly provided on each of the plurality of cover members so as to protrude toward the housing main body side is made to abut against the housing main body, thus causing an increase in the size of the cover member and, consequently, an increase in the size and weight of the mirror housing.

The present invention has been accomplished in light of such circumstances, and it is an object thereof to provide a vehicle door mirror that enables an engaged state of a plurality of cover members with a housing main body to be maintained while avoiding any increase in the size and weight of a mirror housing.

Means for Solving the Problems

In order to attain the above object, according to a first aspect of the present invention, there is provided a vehicle door mirror comprising a mirror housing that is formed from a housing main body having a mirror housing recess part having a mirror housed therein, and a plurality of cover members that cover the housing main body from a side opposite to an open direction of the mirror housing recess part, the cover members, which are engaged with each other, being engaged with the housing main body, characterized in that the plurality of cover members each have projectingly provided thereon a restricting projection part that protrudes toward the housing main body side so as to restrict flexing of the cover member to a side close to the housing main body, a first of the restricting projection parts projectingly provided on one cover member among the plurality of cover members, which are engaged with each other, is formed so as to be shorter than a second of the restricting projection parts projectingly provided on the other cover member and abutting against the housing main body and is disposed so as to overlap the second restricting projection part in an up-and-down direction, and the second restricting projection part has formed thereon an abutment face, an extremity portion of the first restricting projection part being in the proximity of or abutting against the abutment face.

Further, according to a second aspect of the present invention, in addition to the first aspect, a groove is formed in a base end portion of the second restricting projection part, which has an extremity portion abutting against the housing main body, the groove having one end part on the housing main body side closed as the abutment face and having the other end part on a side opposite to the housing main body open, the first restricting projection part being fitted into the groove.

Effects of the Invention

In accordance with the first aspect of the present invention, since the first restricting projection part on one cover member side is shorter than the second restricting projection part on the other cover member side, and is disposed so as to overlap the second restricting projection part in the up-and-down direction, and the extremity portion of the first restricting projection part is in the proximity of or abuts against the abutment face formed on the second restricting projection part, when an external force acts on one cover member side it is possible for the housing main body to receive the external force via the second restricting projection part and the first restricting projection part abutting against the abutment face, and when an external force acts on the other cover member side it is possible for the housing main body to receive the external force via the second restricting projection part, thus preventing the cover member from being flexed by the action of external force and consequently enabling engagement between the cover members and engagement of the cover member with the housing main body to be maintained. Moreover, the first restricting projection part is formed so as to be shorter than the second restricting projection part, thus suppressing any increase in the size and weight of the cover member having the first restricting projection part, and consequently suppressing any increase in the size and weight of the mirror housing.

Furthermore, in accordance with the second aspect of the present invention, since the first restricting projection part is fitted into the groove formed in the second restricting projection part, it is possible to lighten the weight of the cover member, on which the second restricting projection part is provided, thus suppressing more effectively any increase in the weight of the mirror housing.

EXPLANATION OF REFERENCE NUMERALS AND SYMBOLS

11 Mirror
13 Mirror housing recess part
14 Housing main body
16 Skull cap, which is cover member
17 Lower housing, which is cover member
12 Mirror housing
58 First restricting projection part
58a Extremity portion of first restricting projection portion
59 Second restricting projection part
59a Extremity portion of second restricting projection part
59b Base end portion of second restricting projection part
60 Abutment face
61 Groove

MODES FOR CARRYING OUT THE INVENTION

An embodiment of the present invention is explained below while referring to the attached FIG. 1 to FIG. 8.

First Embodiment

Figure 1:
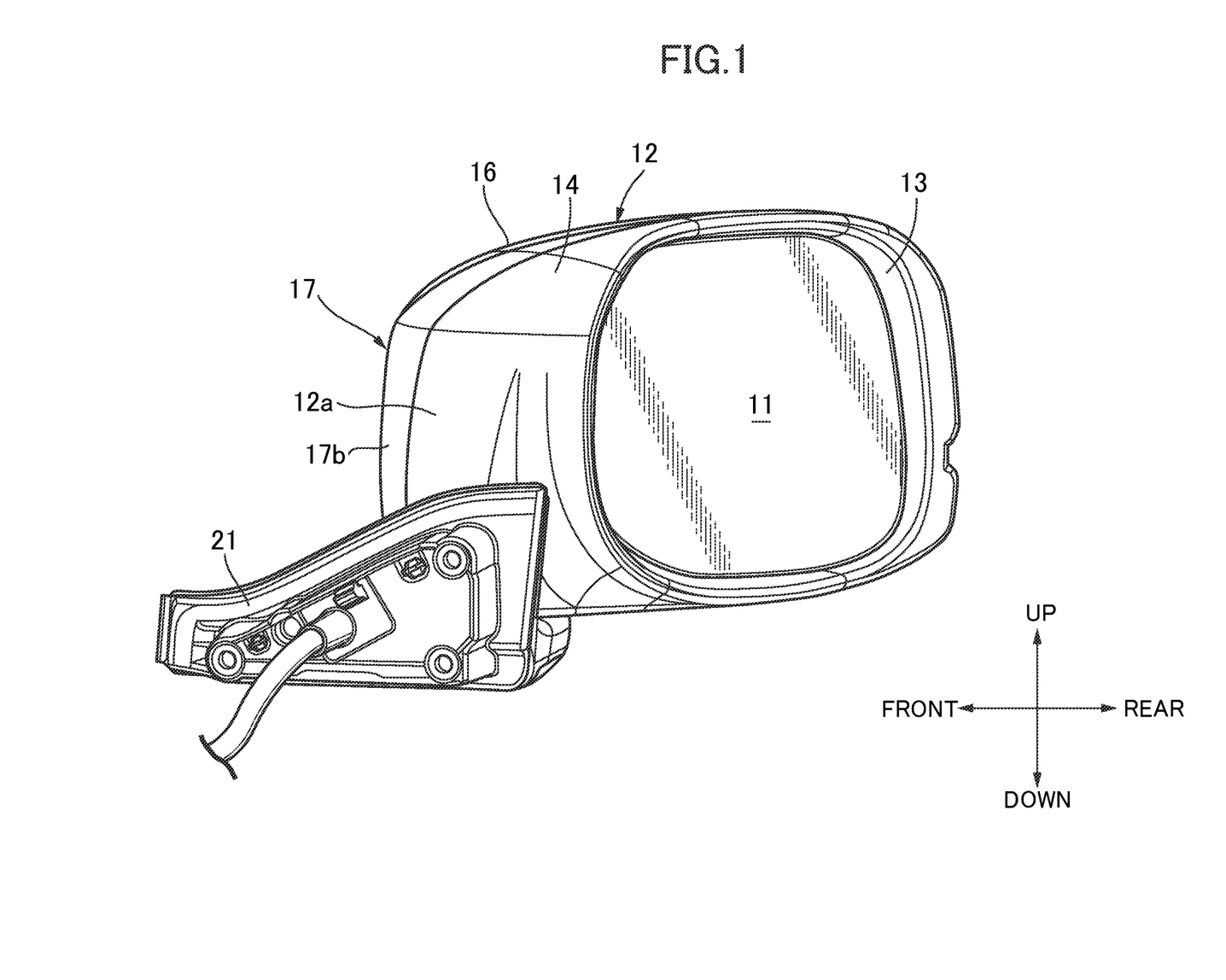
FIG. 1 is a perspective view when a vehicle door mirror is viewed obliquely from the rear. (first embodiment)
Figure 2:
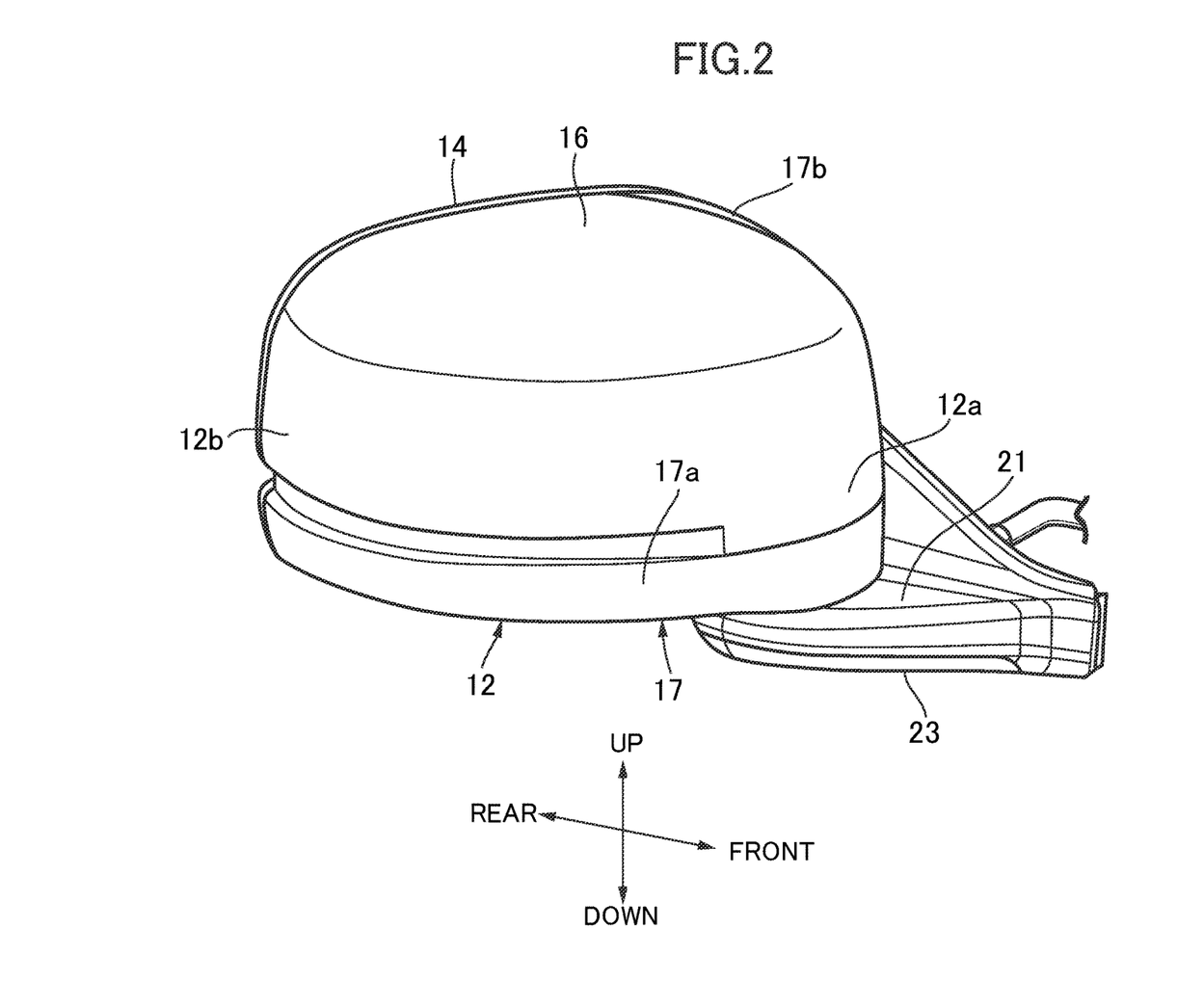
FIG. 2 is a perspective view when the vehicle door mirror is viewed obliquely from the front. (first embodiment)

First, in FIG. 1 and FIG. 2, a mirror housing 12 having fitted therein a mirror 11 for viewing to the rear of a vehicle is disposed on left and right front side doors in a passenger vehicle so that the mirror housing 12 can pivot between a raised position in which it protrudes to the side from the front side door and a retracted position in which it is retracted toward the front side door.

Figure 3:
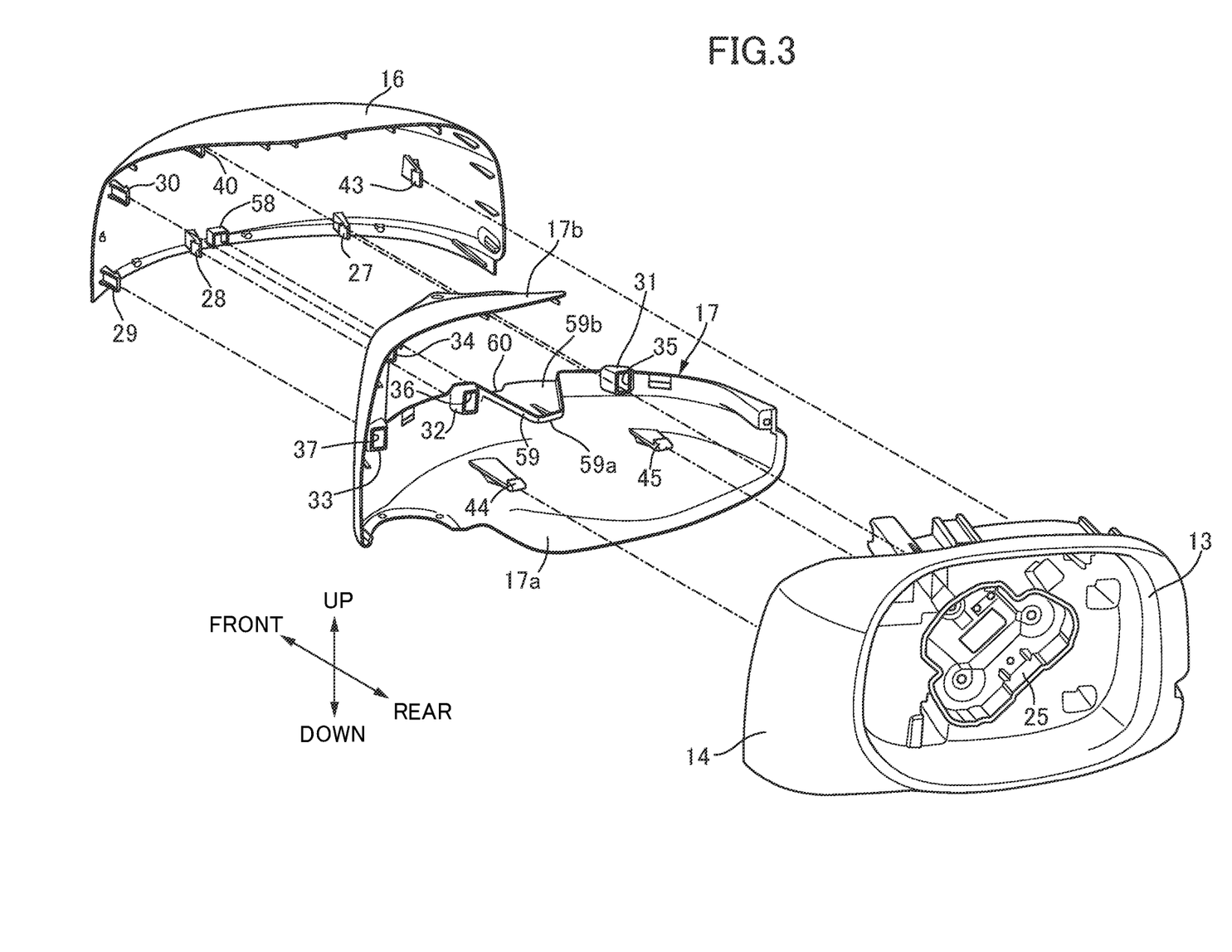
FIG. 3 is an exploded perspective view of a mirror housing. (first embodiment)

Referring in addition to FIG. 3, the mirror housing 12 is formed from a housing main body 14 that is made of a resin and has a mirror housing recess part 13 having the mirror 11 housed therein, and a plurality of cover members that are engaged with each other and are also engaged with the housing main body 14 while covering the housing main body 14 from the side opposite to the open direction of the mirror housing recess part 13, and in this embodiment a skull cap 16 and lower housing 17, which are a pair of cover members made of a resin, are elastically engaged with the housing main body 14.

The mirror 11 is retained by a mirror holder, which is not illustrated, and the mirror 11, which is retained by the mirror holder, is disposed in an opening of the housing main body 14, that is, an open end part of the mirror housing recess part 13.

A base member 21 that is made of a resin is mounted on the front side door, and a base end portion 12a of the mirror housing 12 is pivotably supported on the base member 21 at a position spaced outward from the front side door. A base cover 23 that is made of a resin and covers the base member 21 from below is detachably mounted on the base member 21.

An electric retraction unit (not illustrated) is housed within the mirror housing 12, and the electric retraction unit can pivot the mirror housing 12 between the raised position in which an extremity portion 12b of the mirror housing 12 protrudes to the side from the front side door and the retracted position in which the mirror housing 12 is retracted toward the front side door. A mounting recess part 25 is formed in the housing main body 14, the mounting recess part 25 housing and fixing a mirror angle adjustment unit (not illustrated) that enables the mirror holder holding the mirror 11 to pivot in left-and-right and up-and-down directions.

Figure 4:
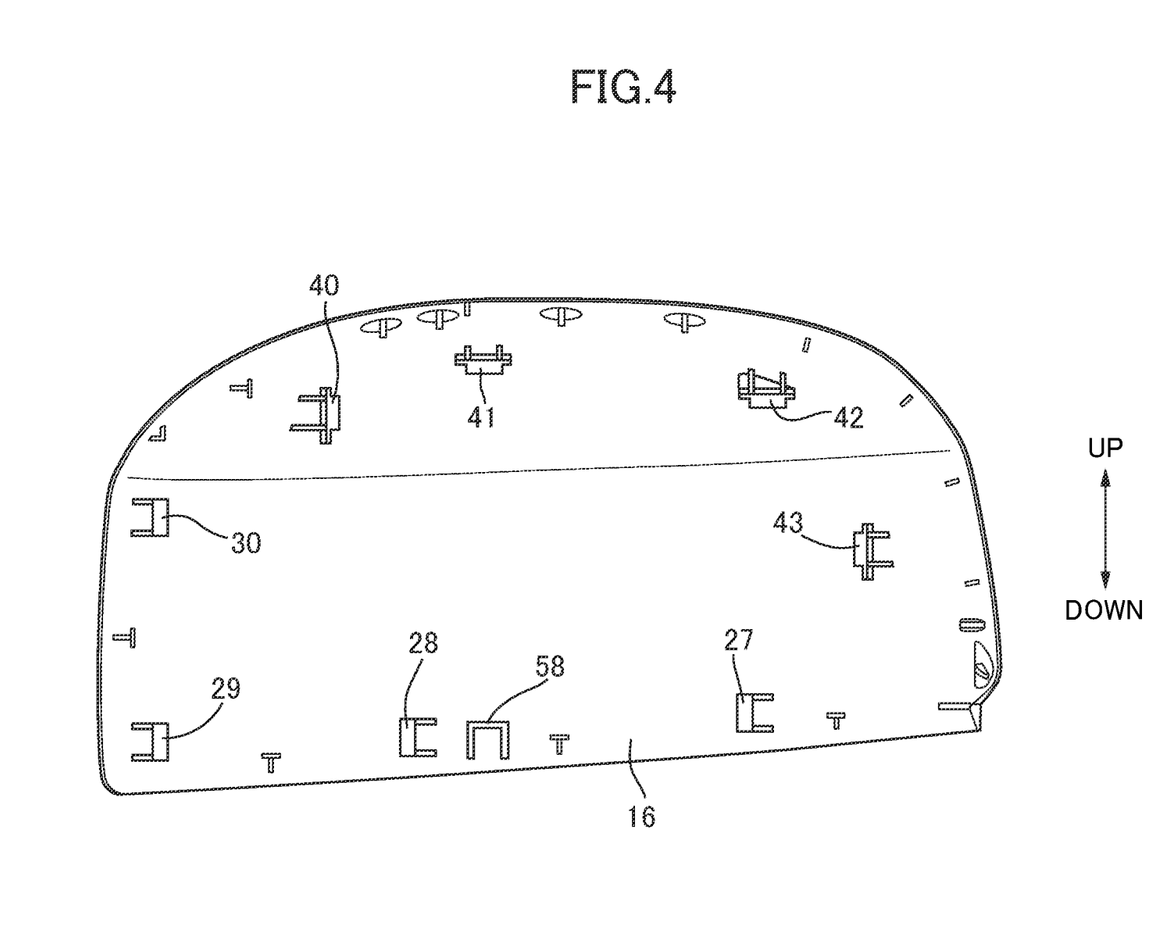
FIG. 4 is a front view of a skull cap when viewed from a housing main body side. (first embodiment)

Referring in addition to FIG. 4, the skull cap 16 is formed so as to cover an upper part of the housing main body 14 from the side opposite to the open direction of the mirror housing recess part 13.

First, second, and third engagement claws 27, 28, 29 arranged in sequence from the outside to the inside in the vehicle width direction in a state in which the mirror housing 12 is at the raised position are projectingly provided integrally with a lower part of the skull cap 16 so as to be spaced from each other and protrude toward the housing main body 14 side. A fourth engagement claw 30 is projectingly provided integrally with the skull cap 16 at a position spaced upward from the third engagement claw 29 so as to protrude toward the housing main body 14 side.

Figure 5:
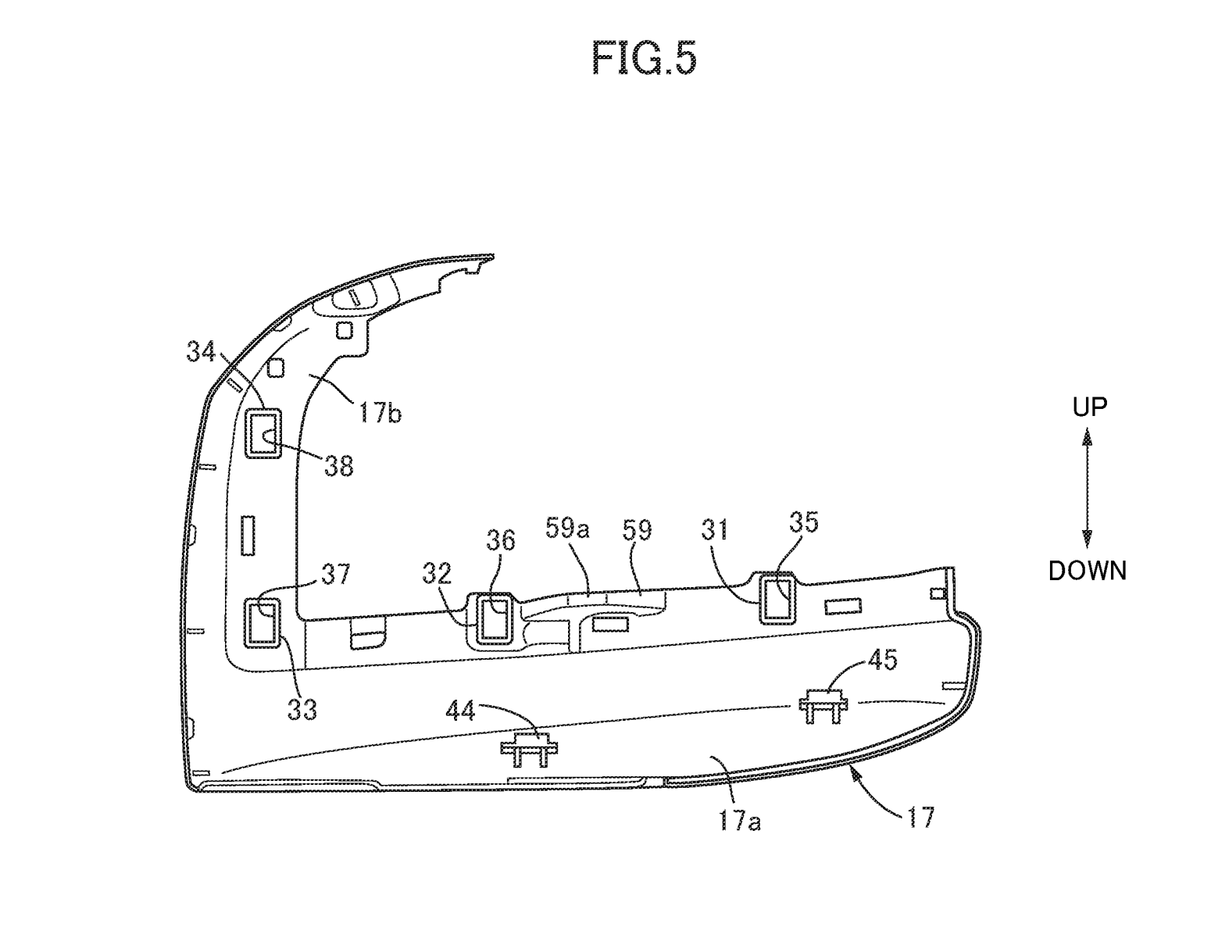
FIG. 5 is a front view of a lower housing when viewed from the housing main body side. (first embodiment)

Referring in addition to FIG. 5, the lower housing 17 integrally has a lower housing main portion 17a that is disposed beneath the skull cap 16 and covers a lower part of the housing main body 14 from the side opposite to the open direction of the mirror housing recess part 13, and an extending portion 17b that extends upward from an end part, on the base member 21 side, of the lower housing main portion 17a, the extending portion 17b being bent into a substantially L-shaped form.

Provided on an upper part of the lower housing main portion 17a of the lower housing 17 are first, second and third latching parts 31, 32, 33 corresponding to the first to third engagement claws 27, 28, 29 projectingly provided on the skull cap 16, and provided on the extending portion 17b of the lower housing 17 is a fourth latching part 34 corresponding to the fourth engagement claw 30 projectingly provided on the skull cap 16.

Formed in the first to fourth latching parts 31 to 34 are first, second, third and fourth through holes 35, 36, 37, 38 that have a rectangular shape for the first to fourth engagement claws 27 to 30 to be inserted through. Elastically engaging the first to fourth engagement claws 27 to 30 inserted through the first to fourth through holes 35 to 38 with the first to fourth latching parts 31 to 34 engages the skull cap 16 and the lower housing 17 with each other.

The skull cap 16 and the lower housing 17 in a mutually engaged state are engaged with the housing main body 14. In order to achieve this engagement with the housing main body 14, fifth, sixth and seventh engagement claws 40, 41, 42 that are spaced from each other and arranged in sequence from the inside to the outside in the vehicle width direction in a state in which the mirror housing 12 is at the raised position are projectingly provided integrally with an upper part of the skull cap 16 so as to protrude toward the housing main body 14 side, and an eighth engagement claw 43 is projectingly provided integrally with the skull cap 16 at a position spaced downward from the seventh engagement claw 42 so as to protrude toward the housing main body 14 side. Ninth and tenth engagement claws 44, 45 that are spaced from each other and arranged in sequence from the inside to the outside in the vehicle width direction in a state in which the mirror housing 12 is at the raised position are projectingly provided integrally with a lower part of the lower housing main portion 17a of the lower housing 17 so as to protrude toward the housing main body 14 side.

Figure 6:
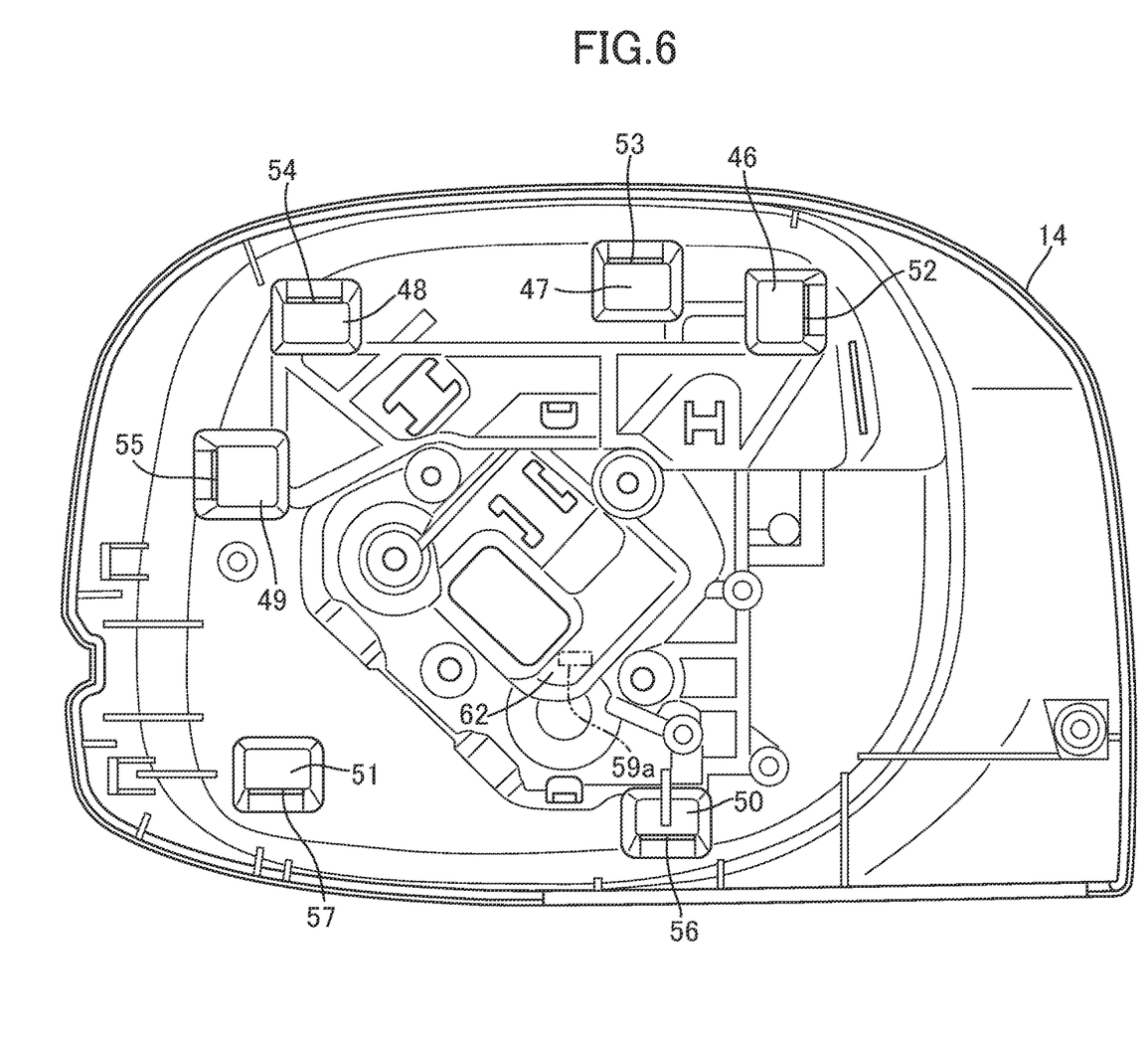
FIG. 6 is a view of the housing main body when viewed from the side opposite to a mirror housing recess part. (first embodiment)

In FIG. 6, formed on the housing main body 14 at positions corresponding to the fifth to tenth engagement claws 40 to 45 are fifth, sixth, seventh, eighth, ninth and tenth latching parts 46, 47, 48, 49, 50, 51. Formed in the fifth to tenth latching parts 46 to 51 are fifth, sixth, seventh, eighth, ninth and tenth through holes 52, 53, 54, 55, 56, 57 that have a rectangular shape for the fifth to tenth engagement claws 40 to 45 to be inserted through. Elastically engaging the fifth to tenth engagement claws 40 to 45 inserted through the fifth to tenth through holes 52 to 57 with the fifth to tenth latching parts 46 to 51 engages the skull cap 16 and the lower housing 17 with the housing main body 14.

Figure 7:
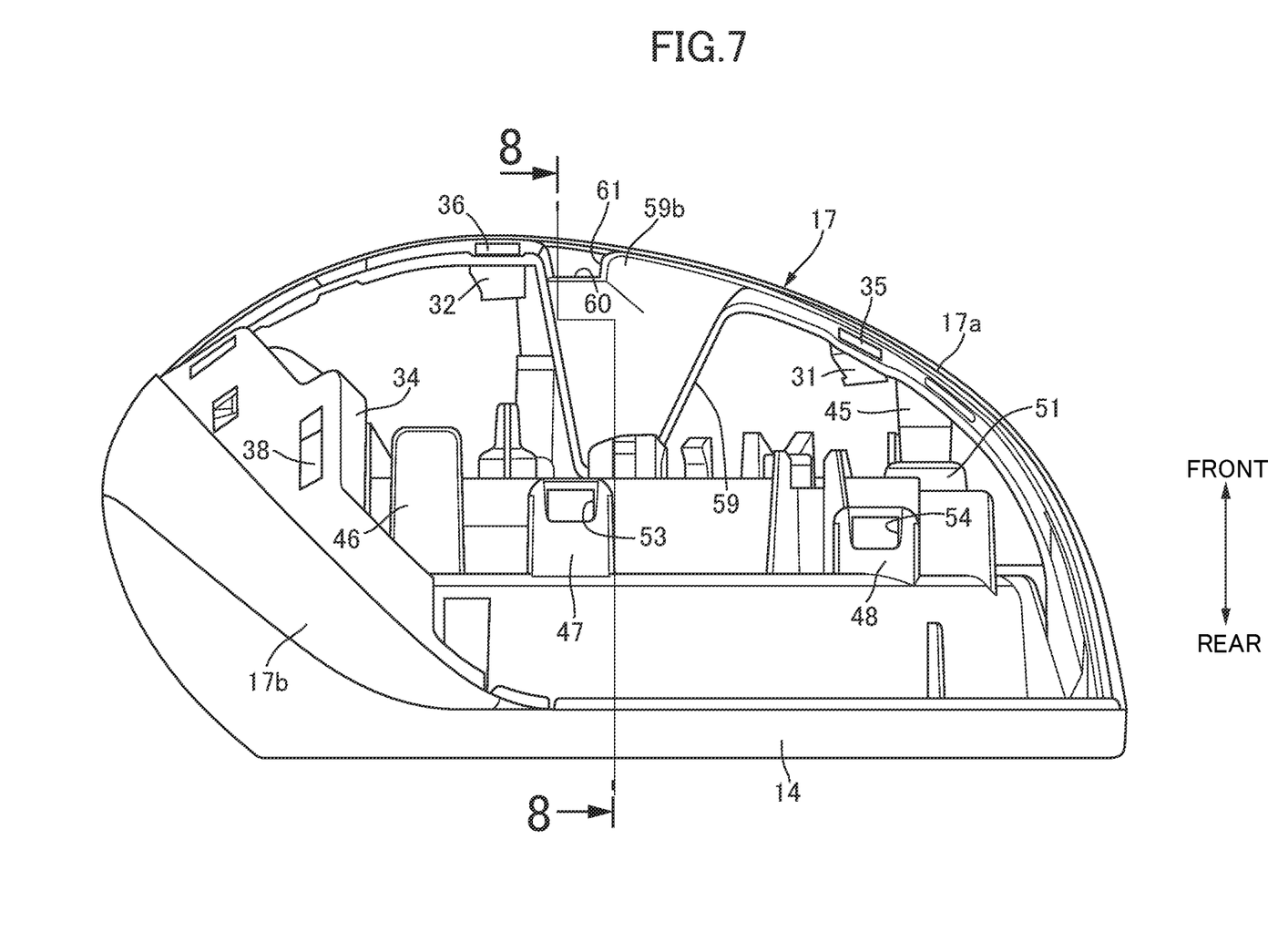
FIG. 7 is a plan view of the mirror housing in a state in which the skull cap is omitted. (first embodiment)
Figure 8:
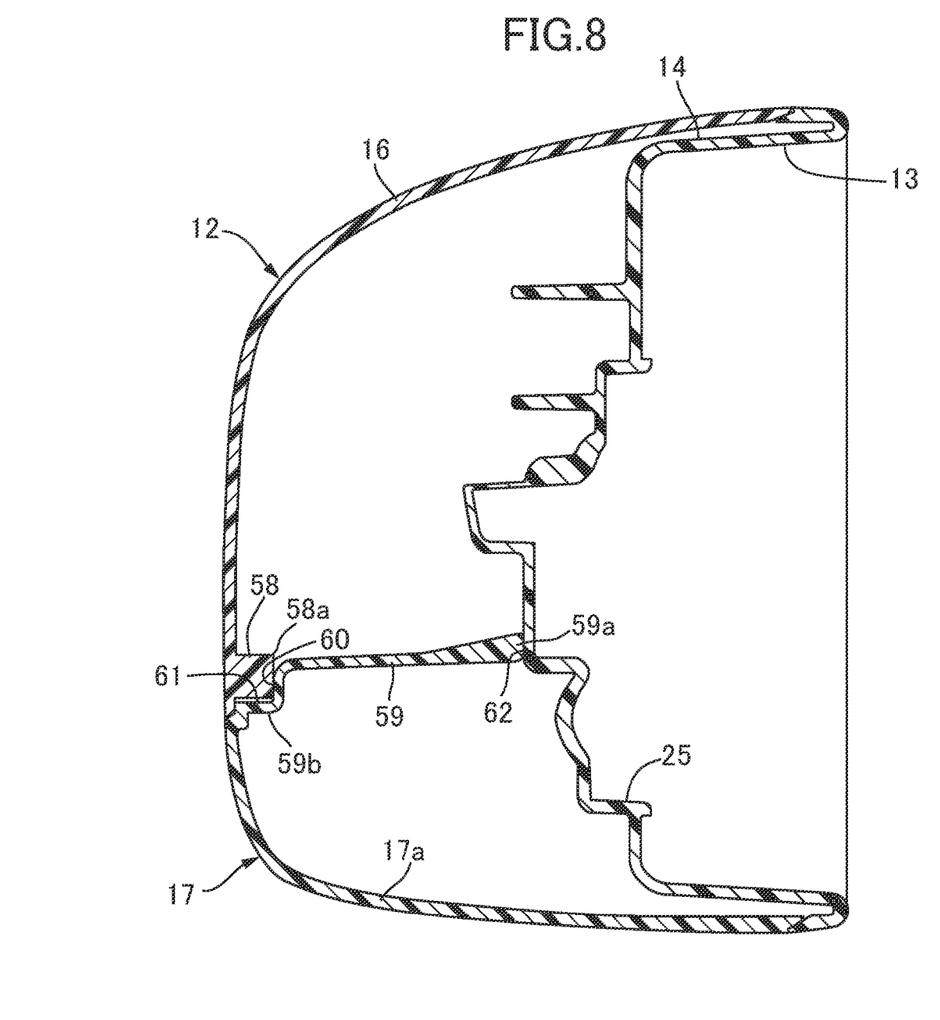
FIG. 8 is a sectional view along line 8-8 in FIG. 7. (first embodiment)

Referring in addition to FIG. 7 and FIG. 8, projectingly provided integrally with the skull cap 16 so as to protrude toward the housing main body 14 side is a first restricting projection part 58 for restricting flexing of the skull cap 16 toward the side close to the housing main body 14, and projectingly provided integrally with the lower housing 17 so as to protrude toward the housing main body 14 side is a second restricting projection part 59 for restricting flexing of the lower housing 17 to the side close to the housing main body 14.

The first restricting projection part 58 is projectingly provided integrally with a lower part of the skull cap 16 so as to be disposed in substantially the middle part of the lower part of the skull cap 16 in the vehicle width direction in a state in which the mirror housing 12 is at the raised position. The second restricting projection part 59 is projectingly provided integrally with the lower housing main portion 17a of the lower housing 17 so as to make its extremity portion 59a abut against a receiving face 62 formed on the housing main body 14, and is projectingly provided integrally with an upper part of the lower housing main portion 17a so as to be disposed in substantially the middle part of the upper part of the lower housing main portion 17a in the vehicle width direction in a state in which the mirror housing 12 is at the raised position.

Moreover, the first restricting projection part 58 is formed so as to be shorter than the second restricting projection part 59 and is disposed so as to overlap the second restricting projection part 59 in the up-and-down direction, and an abutment face 60 is formed on the second restricting projection part 59, an extremity portion 58a of the first restricting projection part 58 being in the proximity of or abutting against the abutment face 60.

Formed in a base end portion 59b of the second restricting projection part 59 is a groove 61 that has one end part thereof on the housing main body 14 side closed as the abutment face 60 and has the other end part on the side opposite to the housing main body 14 open, and the first restricting projection part 58 is fitted into the groove 61.

The operation of the embodiment is now explained. Among the skull cap 16 and the lower housing 17, which are engaged with each other, the first restricting projection part 58 projectingly provided on the skull cap 16 is formed so as to be shorter than the second restricting projection part 59, which is projectingly provided on the lower housing 17 and abuts against the housing main body 14, and is disposed so as to overlap the second restricting projection part 59 in the up-and-down direction, and the abutment face 60 is formed on the second restricting projection part 59, the extremity portion 58a of the first restricting projection part 58 being in the proximity of or abutting against the abutment face 60. Therefore, when an external force acts on, among the skull cap 16 and the lower housing 17, the skull cap 16 side it is possible for the housing main body 14 to receive the external force via the first restricting projection part 58, which abuts against the abutment face 60, and the second restricting projection part 59, and when an external force acts on the lower housing 17 side it is possible for the housing main body 14 to receive the external force via the second restricting projection part 59, thus preventing the skull cap 16 and the lower housing 17 from being flexed by the action of external force, and consequently enabling engagement between the skull cap 16 and the lower housing 17 and engagement of the skull cap 16 and the lower housing 17 with the housing main body 14 to be maintained. Moreover, the first restricting projection part 58 is formed so as to be shorter than the second restricting projection part 59, thus suppressing any increase in the size and weight of the skull cap 16 having the first restricting projection part 58, and consequently suppressing any increase in the size and weight of the mirror housing 12.

Furthermore, the groove 61 is formed in the base end portion 59b of the second restricting projection part 59 having its extremity portion abutting against the housing main body 14, the groove 61 having one end part on the housing main body 14 side closed as the abutment face 60 and having the other end part on the side opposite to the housing main body 14 open, the first restricting projection part 58 being fitted into the groove 61, and it is therefore possible to lighten the weight of the lower housing 17, on which the second restricting projection part 59 is provided, thus suppressing more effectively any increase in the weight of the mirror housing 12.

An embodiment of the present invention is explained above, but the present invention is not limited to the embodiment and may be modified in a variety of ways as long as the modifications do not depart from the subject matter.

For example, the above embodiment explains a vehicle door mirror in which the mirror housing 12 is formed by engaging the skull cap 16 and the lower housing 17, which are a pair of cover members, with the housing main body 14, but the present invention may be applied to a vehicle door mirror in which three or more cover members are engaged with the housing main body.

The invention claimed is:

1. A vehicle door mirror comprising:
   a mirror housing that is formed from a housing main body having a mirror housing recess part having a mirror housed therein, and a plurality of cover members that cover the housing main body from a side opposite to an open direction of the mirror housing recess part, the cover members, which are engaged with each other, being engaged with the housing main body, wherein the plurality of cover members each have projectingly provided thereon a restricting projection part that protrudes toward the housing main body side so as to restrict flexing of the cover member to a side close to the housing main body, a first of the restricting projection parts projectingly provided on one cover member among the plurality of cover members, which are engaged with each other, is formed so as to be shorter than a second of the restricting projection parts projectingly provided on the other cover member and abutting against the housing main body and is disposed so as to overlap the second restricting projection part in an up-and-down direction, the second restricting projection part has formed thereon an abutment face, an extremity portion of the first restricting projection part being in the proximity of or abutting against the abutment face, a groove is formed in a base end portion of the second restricting projection part, which has an extremity portion abutting against the housing main body, the groove having one end part on the housing main body side closed as the abutment face and having the other end part on a side opposite to the housing main body open, the first restricting projection part being fitted into the groove, the groove having at least first and second sidewalls and a base extending between the first and second sidewalls, and the first and second sidewalls of the groove being in the proximity of or abutting against respective first and second sidewalls of the first restricting projection part with bottom end faces of the first and second sidewalls of the first restricting projection part being in the proximity of or abutting against the base of the groove.

* * * * *